tion metal complexes include tetrakis (π-allyl) zirconium or hafnium, tris(π-allyl) chromium, tetrakis (π-methallyl zirconium or hafnium, tris(π-methylallyl) chromium and zirconium tris(π-allyl) bromide.

3,840,508
POLYMERISATION PROCESS

Denis George Harold Ballard, Eric Jones, Alexander Joseph Peter Pioli, Peter Anthony Robinson, and Ronald John Wyatt, Runcorn, England, assignors to Imperial Chemical Industries Limited, London, England
No Drawing. Filed Aug. 7, 1970, Ser. No. 62,184
Claims priority, application Great Britain, Aug. 13, 1969, 40,416/69
Int. Cl. C08f 1/30
U.S. Cl. 260—88.2 R    18 Claims

ABSTRACT OF THE DISCLOSURE

Process for the polymerisation of olefinically unsaturated monomers, such as ethylene, propylene, 4-methylpentene-1 and butadiene, using as initiators, transition metal compositions which are the products of reacting a transition metal complex of the formula $R_mMX_p$ with a substantially inert matrix material having a hydroxylic surface which is free from adsorbed water, wherein M is a transition metal of Groups IVA to VIA, R is a hydrocarbon group, X is a monovalent ligand and $m$ and $p$ are integers $m$ having a value from 2 to the highest valency of the metal M and $p$ having a value from 0 to 2 less than the valency of the metal M, except when M is a metal of Group VIA, when $p$ is 0. When present ligand X is preferably halogen.

---

This invention relates to transition metal compositions in which a transition metal complex is chemically bonded to a substantially inert matrix material, and to processes for the polymerisation of olefinically unsaturated monomers using such compositions as initiators.

It is known to absorb organometallic compounds on inert inorganic materials and to use the combinations produced as polymerisation catalysts or the like. We have now found that certain transition metal organometallic compounds may be reacted with specified matrix materials to give rise to stable chemical entities, many of which may be used as initiators for the polymerisation of olefinically unsaturated monomers.

According to one aspect of the present invention we provide a transition metal composition which is the product of reacting a transition metal complex of the general formula $$R_mMX_p \qquad (1)$$

with a substantially inert matrix material having a hydroxylic surface (as hereinafter defined) which is free from adsorbed water, wherein M is a transition metal of Grops IVA to VIA of the Periodic Table of the Elements, R is a hydrocarbon group or substituted hydrocarbon group, X is a monovalent ligand, and $m$ and $p$ are integers, $m$ having a value from 2 to the highest valency of the metal M and $p$ having a value from 0 to 2 less than the valency of the metal M, except when M is a metal of Group VIA when $p$ is always 0.

(All references to the Periodic Table are to the version of the Periodic Table of the Elements printed inside the back cover of "Advanced Inorganic Chemistry" by F. A. Cotton and G. Wilkinson, 2nd Edition, Interscience Publishers, 1966.)

The transition metal is preferably selected from Group IVA; and the monovalent ligand X is preferably a halogen. Hydrocarbon groups of different types may be associated with a single metal atom.

Suitable hydrocarbon groups R include alkyl and alkenyl groups (including π-alkenyl groups such as π-allyl) and substituted derivatives thereof. Examples of transi- A preferred class of organic transition metal complexes, many of which are particularly useful as polymerisation initiators, are those in which some or all of the groups, or ligands, R are substituted alkyl groups of general formula $$—CH_2Y \qquad (2)$$

σ-bonded to the transition metal through the carbon atom as indicated. In this general formula Y represents an atom or group capable of interaction with the vacant d-orbitals of the metal M. Preferably all of the groups R have this formula, but it is possible for some of them to comprise other hydrocarbon groups. It will be appreciated that π-allyl ligands, that is, ligands comprising a grouping of 3 carbon atoms similarly bound to a central metal atom in a planar system, are not included within formula (2) above, as X-ray structural analysis has shown ligands of formula (2) to be σ-bonded in our compounds.

Suitable substituent groups Y include aromatic and polyaromatic groups such as phenyl and naphthyl, giving rise, in formula (2) above, to the alkaryl ligands benzyl and (1-methylene-1-naphthyl) and ring substituted derivatives thereof, for example p-methyl benzyl.

Y may also be a cycloalkenyl group, such as a cyclooctenyl group.

Y may also comprise a group of general formula $$Z(R')_3 \qquad (3)$$

where Z represents silicon, germanium, tin or lead, and R' represents a hydrocarbon group or hydrogen; but is preferably an alkyl group.

Y may also be a halogen.

Examples of this preferred class of transition metal complexes include zirconium and titanium tetra(benzyl), tris(benzyl) zirconium chloride, zirconium tetrakis (p-methyl benzyl), zirconium and titanium tetrakis(1-methylene-1-naphthyl) and zirconium tetrakis(trimethylsilylmethylene).

Examples of complexes containing monovalent ligands X include tris(π-allyl) zirconium chloride, bromide or iodide and the equivalent π-methallyl and benzyl compounds.

By a "hydroxyl surface" we mean a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, say, the transition metal hydrocarbyl complex, the bulk of the matrix material is chemically inert. Particularly good examples of such matrix materials are silica and alumina or mixtures thereof. These comprise a matrix of silicon or aluminium and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica and alumina based materials containing small amounts of other suitable inorganic oxides, such as magnesium oxide and zinc oxide.

It is essential that the matrix material is freed from adsorbed water, as this would merely react with and destroy the transition metal complex. The matrix materials may be readily freed from such adsorbed water by, for example, a simple thermal treatment.

The reaction between the transition metal complex and matrix material comprises displacement of one or more of the hydrocarbon groups by the hydrogen atom of an —OH group or groups, with liberation of the corresponding free hydrocarbon. The reaction may be represented by the following equation:

$$\text{Matrix } (\text{—OH})_n + MR_mX_p \rightarrow \text{Matrix } (\text{—O})_n MR_{m-n}X_p + mRH \quad (4)$$

wherein M, R, X, $m$ and $p$ have the meanings previously ascribed to them and $n$ is an integer being not more than $(m-1)$. It has been found that when the defined components of our transition metal compositions are reacted, all except one of the hydrocarbon groups of the organometallic compound may be displaced by —OH groups of the matrix, so that there is at least always one hydrocarbon group attached to the transition metal in the product. This appears to be independent of the number of reactable hydroxylic groups (as hereinafter defined) present on the surface of the matrix.

The term Matrix (—OH)$_n$ represents an inert matrix having at least $n$ reactable hydroxylic groups attached to its surface. The number of reactable hydroxylic groups, that is, the number available for our reaction, will depend on the nature and condition of the matrix material. For example, in some materials, because of their molecular configuration, some of the hydroxylic groups present are not reactive under our conditions. Thus it is usual to react the matrix, at least initially, with an excess of transition metal complex, so that the number of hydroxylic groups available for the reaction may be determined.

The progress of the reaction in the manner indicated in equation above may be readily followed by evolution of free hydrocarbon RH and by a colour change in the reactants. The fact that the product is a chemical entity, not a physical mixture, i.e. a transition metal complex physically adsorbed on a granular matrix, may be demonstrated by removing the product, a coloured, insoluble composition, from the reactants and washing it with a solvent which would remove any adsorbed complex from the matrix. When this is done, the complex remains on the matrix. Contrary to this, when our complexes are mixed with an inert matrix containing no reactive hydroxylic groups, for example silica which has been calcined at 1200° C., although the complex is adsorbed on the matrix, it is readily removed by washing the product with a solvent.

As previously mentioned, the number of reactive hydroxylic groups present in a given weight of matrix will depend upon its nature (for example, whether it is silica or alumina) and its condition (for example, its surface area and the treatment it has received to remove absorbed water). Thus the precise composition of transition metal compositions according to our invention may vary from one batch or sample to another of the same matrix material; but successive portions of the same material prepared under identical conditions will give products having the some composition.

Compositions according to the present invention may be prepared by contacting a solution of the transition metal complex with a suitable matrix material, in the absence of free or adsorbed water. The solvent used for the complex should be dry and inert; hydrocarbon solvents are preferred. Since many of the transition metal complexes which may be used in our process are thermally unstable, the reaction temperature must be maintained low enough to avoid decomposition of the complex. With some complexes, temperatures below 0° C. are required.

The ratio of transition metal organometallic complex to matrix material may be varied within wide limits depending upon the physical and chemical nature of the components used; but it is preferred that the proportions are chosen so that each reactable hydrocarbon group reacts with a hydroxylic group.

Two methods of preparing transition metal compositions according to our invention, which allow precise and reproducible control of the composition (within the provisos mentioned above) will now be described. A first method comprises suspending the matrix material, which has previously been freed from water, in an inert liquid, and titrating the reactable hydroxylic groups with a solution of the transition metal complex in an inert solvent. Since most transition metal complexes are strongly coloured, the end-point is readily detectable by the presence of a permanent colouration in the suspending solvent. In compositions prepared in this way, all the reactable hydroxylic groups of the matrix are reacted with the metal complex. The compositions produced may then be recovered by filtration from the reaction medium, freed from solvent and stored dry or under solvent in oxygen-free conditions.

It is possible to add less than the complete titre of transition metal complex, or even to add excess transition metal complex, but when excess complex is used, it will remain in the reaction medium when the composition is separated.

A second method for preparing compositions according to our invention comprises, first, adding excess of either transition metal complex or a Grignard reagent (magnesium hydrocarbyl compound) to the matrix material, determining the number of molecules of hydrocarbon liberated, and then adding to a further sample of the matrix material just sufficient of the appropriate transition metal complex to liberate an equivalent amount of hydrocarbon. For example, a sample of the matrix material may be suspended in a solvent and excess of a transition metal $\pi$-allylic compound added. The volume propylene produced is measured and related to the weight of matrix material. A second sample of the matrix material is then taken and a transition metal $\pi$-allylic compound added until the volume of propylene produced per gram of matrix material present is equivalent to that determined by addition of excess transition metal complex.

As already mentioned, the compositions may be separated from the media in which they are produced and exist as chemical entities of definite composition. In many cases they are more thermally stable than the transition metal complexes from which they are produced. For example $Zr(\pi\text{-allyl})_3Br$ decomposes at $-20°$ C. whereas an equivalent composition according to our invention form by reacting $Zr(\pi\text{-allyl})_3Br$ with silica is stable up to 60° C.

We have also discovered that certain of the compositions defined above may be used as initiators for the polymerisation of olefinically unsaturated monomers. In this specification we intend the term "polymerisation" to mean the formation of high molecular weight polymers and we also intend the term to exclude oligomerisation to low molecular weight materials.

According to a second aspect of the present invention olefinically unsaturated monomers are polymerised by means of an initiator which comprises a transition metal composition which is the product of reactng a transiton metal complex of the general formula.

$$R_mMX_p \quad (1)$$

with a substantially inert matrix material having a hydroxylic surface (as hereinbeforedefined) which is free from adsorbed water, wherein M is a transition metal of Groups IVA to VIA of the Periodic Table of the Elements, R is a hydrocarbon group or substituted hydrocarbon group, X is a monovalent ligand, and $m$ and $p$ are integers, $m$ having a value from 2 to the highest valency of the metal M and $p$ having a value from 0 to 2 less than the valency of the metal M, except when M is a metal of Group VIA when $p$ is always 0.

The term "olefinically unsaturated monomer" is intended to include mono-olefins such as ethylene, propylene and 4-methylpentene-1, di-olefins such as butadiene, and certain polar vinyl monomers, such as vinyl chloride. However, it will be appreciated that not all compositions of the type defined above will necessarily polymerise all the above mentioned monomers; but the best monomer/composition combinations may be readily established by simple experiment, as will appear from experimental details set out below. In particular it may be mentioned that some vinyl monomers, e.g. vinyl acetate, react non-catalytically with our compositions and thus may not be polymerised using our initiators.

Our compositions may also be used to initiate the co-polymerisation of two or more olefinically unsaturated monomers. For example, ethylene may be co-polymerised with a small amount of propylene, butene, hexene or decene, butadiene or styrene.

Polymerisation processes according to our invention may be carried out by techniques generally used for free radical initiated polymerisation or for polymerisation processes of the type using Ziegler catalysts.

The choice of conditions of pressure and temperature will vary with factors such as the nature of the monomer and initiator, and whether bulk or diluent polymerisation is used.

For example, when ethylene is polymerized, pressures from subatmospheric to several thousand atmospheres may be used. Low pressure (say from 0.1 to 30 atmospheres), and intermediate pressure (say from 30 to 300 atmospheres) polymerisations may be carried out using conventional equipment; but very high pressure polymerisation must be performed using suitable specialised reactors and pumping equipment. However, since, generally speaking, the higher the pressure the higher the activity, the use of such techniques is often justified. If very high pressures are used, it is preferred that conditions are such that the ethylene feed and polyethylene produced are maintained in a single fluid phase, i.e. the pressure should exceed 500 kg./cm.$^2$, preferably 1000 to 3000 kg./cm.$^2$, and the temperature should be greater than 125° C., say 140–300° C. This type of process is usually operated in a continuous manner. In order that the composition may be pumped successfully, it is imperative that the matrix should be as finely divided as possible to enable it to pass through the very fine mesh filters commonly interposed before the pumps. This may be achieved by reducing the particle size of the matrix material before or after treatment with transition metal complex; but if it is done after treatment rigorous precautions must be taken to exclude air and moisture. Any suitable method of comminution may be used; but the use of an ultrasonic dispersion technique has been found to be particularly satisfactory.

A wide range of temperatures may be used, but in general low and intermediate pressure ethylene polymerisations are carried out at temperatures in the range 50–160° C.

When the process of our invention is used to polymerise propylene, it is preferred to operate under conditions commonly used for the polymerisation of propylene. However, polymerisation of propylene under other conditions, e.g. high pressure, is not excluded.

It is also within the scope of our invention to use our compositions to initiate the copolymerisation of ethylene and propylene together and/or with other olefinically unsaturated monomers.

Except for the polymerisation of ethylene at high pressure, the reaction may be carried out in the liquid or gaseous phase. However, it is preferred that the monomer is used in liquid form and therefore, if it is not liquid under the polymerisation conditions, it is preferred to dissolve it in a suitable solvent. Examples of suitable solvents are aliphatic or aromatic hydrocarbons; for instance pentane, hexane, heptane, octane, decane, benzene, toluene, and mixtures thereof.

Chain transfer agents may be used in polymerisations according to our invention, and when ethylene is polymerised, their use is normally desirable as the polyethylene produced is of very high molecular weight. Hydrogen may be conveniently used in accordance with usual practice. However, some solvents may act as chain transfer agents.

Our process is preferably effected under an atmosphere free of oxygen, for example under an atmosphere of an inert gas, e.g. nitrogen, or of the monomer to be polymerised. It is also preferred to effect the process using apparatus and solvents which have been carefully freed from impurities, such as oxygen, water and other substances which would otherwise react with the initiators.

It has been found that in many instances our compositions are unexpectedly active in the polymerisation of olefinically unsaturated monomers, particularly ethylene. The activity of the composition is frequently many times greater than that of the transition metal complex which is used in its preparation.

The invention is illustrated by the following Examples.

Example 1

An inert matrix material comprising hydrated precipitated silica (Manosil VN3 supplied in UK by Hardman and Holden Ltd.) having a particle size in the range 15 to 20 millimicrons was heated at 200° C. for two hours at a pressure less than $10^{-4}$ torr to free it from adsorbed water. After treatment, the available surface hydroxyl content was measured by addition of excess methyl magnesium iodide. The amount of methane evolved was 0.86 millimoles per gram of silica.

On addition of excess tetrakis($\pi$-allyl) zirconium to a suspension of similarly prepared silica in toluene, 0.86 millimoles of propylene was evolved per gram of silica. Step-wise addition of the zirconium complex to the silica showed that two molecules of propylene were evolved per molecule of zirconium complex.

A transition metal composition was prepared by adding 0.43 millimoles of tetrakis($\pi$-allyl) zirconium to a suspension of dried silica (1 g. prepared as above) in toluene. The dark red colour of the zirconium compound was discharged and a green coloured zirconium composition was obtained. The composition was stored in a dry inert atmosphere either under toluene or free from liquid.

Thus, addition of only $x$ millimoles of tetrakis($\pi$-allyl) zirconium, where $x < 0.43$, to 1 gram of silica would give rise to $x$ millimoles of the composition, together with inert silica matrix having $(y-2x)$ available, but unreacted, hydroxyl groups where $y$ is the available hydroxyl content per gram of silica.

Example 2

A sample of silica (1 g.) prepared as described in Example 1 was suspended in toluene. The reactable hydroxyl groups were titrated with a solution of tris($\pi$-allyl) zirconium bromide in toluene. It was found that 0.43 millimoles could be added before the supernatant liquid became coloured. The zirconium composition obtained was brown.

Further samples of transition metal composition according to our invention were prepared by addition of a solution of tris($\pi$-allyl) zirconium bromide to prepared silica suspended in toluene at the rate of 0.43 millimoles of zirconium compound per gram of silica.

Examples 3–5

The following compositions according to our invention were made by the procedure of Example 1 using the same matrix material. The appropriate details are summarised below in Table 1.

TABLE 1

| Example Number: | Components of the composition | Colour | $n^*$ |
|---|---|---|---|
| 3 | Cr(methallyl)$_3$-SiO$_2$ | Brown | 2 |
| 4 | Hf($\pi$-allyl)$_4$-SiO$_2$ | do | 2 |
| 5 | Zr($\pi$-allyl)$_2$Br$_2$-SiO$_2$ | do | 1 |

*Number of mols of propylene evolved by each mol of transition metal complex reacted with SiO$_2$.

Example 6

A high purity γ alumina (supplied by Koninklijke Zwavelzuurfabriken v/h Ketjen NV) was freed from water by heating at 600° C. for two hours under a vacuum of at least $10^{-4}\tau$. It was then cooled under an atmosphere of dry nitrogen and suspended in dry oxygen-free benzene.

A sample of the suspension was titrated with a solution of zirconium tetrabenzyl in benzene, the end point being indicated by a permanent colour in the suspending solvent. Step-wise addition of the same zirconium complex to a further sample of the alumina suspensions showed that two molecules of toluene were evolved per molecule of zirconium complex.

A zirconium tetrabenzyl composition was prepared by adding 0.4 millimoles of zirconium tetrabenzyl per gram of dried alumina suspended in toluene. The yellow colour of the zirconium tetrabenzyl was discharged from the toluene and a yellow coloured composition was obtained.

Example 7

A zirconium tetrakis(π-allyl)-alumina composition was prepared by adding 0.4 millimoles of the zirconium complex per g. of dried alumina as described in Example 6. The composition was green in colour and two moles of propylene were evolved per zirconium atom during the preparation.

Examples 8 and 9

The procedure of Example 7 was repeated using as complex niobium tetrakis(π-allyl) and molybdenum(π-allyl) respectively. In Example 8 the complex was blue and the composition brown; in Example 9 the complex was blue/green and the composition brown.

Polymerisations Initiated by our Compositions

In the following Examples, the matrix material was freed from adsorbed water by one of the three following procedures. These are identified by the letters A, B and C for the sake of convenience. When these letters are given in the tables of Examples, in the case of A and C it will be followed by a temperature, but not in the case of B since the temperature is constant.

Procedure A

The matrix material was heated for 2 hours in a furnace at the temperature indicated under a vacuum of at least $10^{-4}\tau$. It was then cooled under an atmosphere of dry nitrogen and suspended in dry oxygen-free toluene.

Procedure B

The matrix material was refluxed with xylene for 3 hours and the water which was extracted removed by way of a Dean and Stark apparatus, leaving the matrix material suspended in xylene.

Procedure C

The matrix material was heated for 2 hours in a furnace at the temperature indicated in an atmosphere of dry, oxygen-free nitrogen. It was then allowed to cool under the atmosphere of nitrogen and finally suspended in dry oxygen-free toluene.

The initiator compositions used in the following Examples were prepared by reacting together the transition metal complex and matrix material shown against each Example number, the matrix having been freed from water by the procedure indicated. The reaction was conducted using the appropriate procedure described in one or more of Examples 1–9.

Examples 10–22

Polymerisation of Ethylene (Low Pressure Batch) Procedure.—A 1 litre stainless steel stirred autoclave was carefully dried and all oxygen removed. 500 ml. of toluene was added, the vessel heated to 80° C. and hydrogen and ethylene added to the pressures stated. The suspension of the appropriate initiator composition was then added via a pump to start the reaction. The reaction pressure was maintained by the addition of ethylene only and the reaction temperature controlled by cooling. The pressure was released in nearly all cases after 1 hour, the vessel cooled and the product polyethylene, which was in a fine particulate form, was freed from the solvent. The polyethylene produced was of the type commonly referred to as high density.

The results are summarised in Table 2. The melt flow index (M.F.I.) of the product was measured using A.S.T.M. D1238–62T. The last two entries in Table 2 relate to polymerisations performed homogeneously with a solution of the appropriate complex in the absence of matrix material. These are included by way of comparison and show the marked increase in activity which may be obtained by the use of our invention. Activity is expressed as g. polymer/milliatom transition metal/atmosphere/hour.

TABLE 2

| Example number | Transition metal complex | Matrix | Matrix pretreatment | Initiator concentration (mM. of mpetal) | Ethylene pressure (atoms) | Hydrogen pressure (atoms) | Yield, gm. | Activity | M.F.I. |
|---|---|---|---|---|---|---|---|---|---|
| 10 | Zr(π-allyl)$_4$ | Al$_2$O$_3$ | C 500° C. | 0.1 | 4 | 20 | 119 | 595 | 2.2 |
| 11 | Zr(π-allyl)$_4$ | SiO$_2$ | B | 0.2 | 10 | 10 | 75 | 38 | 0.01 |
| 12 | Zr(benzyl)$_4$ | Al$_2$O$_3$ | A 650° C. | 0.1 | 4 | 20 | 90 | 386 | 0.16 |
| 13 | Zr(π-allyl)$_3$Br | Al$_2$O$_3$ | A 500° C. | 0.2 | 4 | 20 | 94 | 118 | 1.7 |
| 14 | Zr(π-allyl)$_3$Br | SiO$_2$ | B | 0.1 | 4 | 4 | 84 | 210 | 0.41 |
| 15 | Zr(π-allyl)$_2$Br$_2$ | Al$_2$O$_3$ | A 200° C. | 0.2 | 4 | 4 | 44 | 55 | 0.90 |
| 16 | Zr(benzyl)$_3$Cl | Al$_2$O$_3$ | A 500° C. | 0.2 | 20 | 4 | 86 | 108 | 3.0 |
| 17 | Zr(paramethylbenzyl)$_4$ | Al$_2$O$_3$ | C 500° C. | 0.1 | 4 | 20 | 124 | 310 | 0.94 |
| 18 | Cr(π-allyl)$_3$ | Al$_2$O$_3$ | A 500° C. | 0.2 | 4 | 4 | 46 | 58 | 1.5 |
| 19 | Cr(π-methallyl)$_3$ | SiO$_2$ | B | 0.5 | 10 | 5 | 65 | 13 | 0.29 |
| 20 | Ti(benzyl)$_4$ | Al$_2$O$_3$ | A 500° C. | 0.2 | 4 | 4 | 71 | 89 | |
| 21 | Hf(π-allyl)$_4$ | SiO$_2$ | B | 0.5 | 10 | 5 | 12.7 | 2.5 | |
| 22 | Zr(CH$_2$-SiMe$_3$)$_4$ | Al$_2$O$_3$ | A 650° C. | 0.2 | 4 | 20 | 114 | 142 | 0.41 |
| | Zr(π-allyl)$_4$ | | | 1.5 | 10 | 10 | 15 | 1.0 | |
| | Zr(benzyl)$_4$ | | | 1.5 | 10 | 10 | 7 | 0.5 | |

Example 23

Polymerisation of Ethylene (Low Pressure Continuous).—The following materials were continuously metered to a 6 litre autoclave at the rates stated: dry deoxygenated toluene (3 litres/hr.), pure ethylene (400 litres/hr.), pure hydrogen (400 litres/hr.) and a slurry of a zirconium tetrabenzyl/alumina initiator composition prepared in accordance with our invention, the slurry being metered at such a rate that it maintained an initiator concentration of 0.05 mm. zirconium/litre in the autoclave. Polymer slurry was removed continuously from the autoclave, the pressure of which was maintained at 16 atmospheres and the temperature at 80° C. When steady state conditions had been achieved, the activity was found to be 230 g. polyethylene/milliatom zirconium/atmosphere/hour. The product had an MFI of 0.40.

The polymers produced in the continuous reactor were typical high density homopolymers having annealed densities in the range 0.960 to 0.970 g./ml. Their infra-red end group analyses were typical for polymers of MFI 0.45, i.e. 2.5 methyl groups per 1000 carbon atoms and 0.2 unsaturated groups (terminal vinyl and pendant unsaturation) per 1000 carbon atoms. Mechanical and rheological properties were also a characteristic of high density polyethylene homopolymers, i.e. yield strengths of 280–320 kg./cm.$^2$, elongations to break of 900–1200% at a strain rate of 200%/minutes.

Examples 24 and 25

Copolymerisation of Ethylene with Propylene.—The procedure of Examples 10–22 was followed with the exception that a given volume of pure liquid propylene was added to the autoclave prior to the addition of ethylene. In each case the matrix used was alumina (dried, in the case of Example 24, by procedure C at 500° C.; and in the case of Example 25, by procedure A at 650° C.), the concentration of initiator composition was equivalent to 0.1 ma. of zirconium and the ethylene and hydrogen pressures were 4 and 20 atmospheres respectively.

The results are set out in Table 3.

TABLE 3

| Example number | Transition metal complex | Propylene added (ml.) | Yield of copolymer (g.) | Activity, g./ma./at./hr. | M.F.I. | Density g./ml. |
|---|---|---|---|---|---|---|
| 24 | Zr($\pi$-allyl)$_4$ | 10 | 86 | 258 | 3.3 | 0.951 |
| 25 | Zr(benzyl)$_4$ | 20 | 163 | 408 | 1.1 | 0.950 |

Examples 26–35

Polymerisation of Propylene Procedure.—A 1 litre stainless steel stirred autoclave was carefully dried and all oxygen was removed. 300 ml. of toluene (in example 31 heptane) was added and a suspension of the initiator composition was introduced, the autoclave was heated to 65° C. and propylene was introduced until the pressure was as stated in Table 4. The reaction pressure was maintained by the addition of propylene and the temperature controlled by cooling. After the stated time the pressure was released, the autoclave and contents cooled and the product polypropylene removed and freed from solvent. The results are set out in Table 4.

Note: In example 34 the matrix material was pretreated by refluxing with water for 15 hours followed by drying at 500° C. for 2 hours in an atmosphere of nitrogen; in example 35 the pretreatment consisted of annealing the matrix by heating in air to 900° C. for 15 hours, refluxing with water for 15 hours followed by drying at 500° C. for 2 hours in an atmosphere of nitrogen.

released with high-purity propylene, i.e. propylene containing no more than 0.5 p.p.m. of allene, acetylenes, butenes, carbon monoxide, oxygen, sulphur compounds, water etc. This was repeated six times. The reactor and carrier polymer was then purged continuously with the pure monomer for 15–20 hours at a gas rate of 175–400 litres/hour, and the autoclave pressure of 2–5 p.s.i.g. The stirrer was then stopped, the initiator injected into the reactor, and stirring then continued for 25–65 minutes. Purging was then stopped, and the reactor pressurised to 20–27 kg./cm.$^2$ in 25–45 minutes with high purity propylene. 2–4 hours later the autoclave was vented and polymer removed.

Example 36

660 g. of carrier polymer charged to reactor at 76° C. stirred, and evacuated and purged six times with high purity propylene. Reactor was then purged 19 hours at 395 litres/hour with high purity propylene.

7.5 millimoles of zirconium tetrakis($\pi$-allyl)/Al$_2$O$_3$ initiator composition was then injected into the reactor, and stirring and purging continued for 30 minutes. A further 7.5 millimoles of the initiator was charged, and stirring and purging continued for further 35 minutes.

The reactor was then pressurised to 27 kg./cm.$^2$ in 25 minutes with high purity propylene. Polymerisation was continued for a further 1½ hours when the autoclave was vented and the polymer removed. The polymer yield was 690 g. giving an activity of 0.85 g./ma. Zr/atmos./hr.

Example 37

400 g. of carrier polymer charged to reactor at 76° C., stirred and evacuated and purged six times with high purity propylene. Reactor then purged with high purity propylene for 18½ hours, at a rate of 178 litre/hour.

6.5 millimoles of zirconium tetrakis($\pi$-allyl)/alumina initiator composition was injected into the reactor, stirring and purging continuing for 10 minutes. A further 6.0 millimoles of the initiator was then charged, stirring and purging again for 10 minutes. The reactor was then pressurised to 27 kg./cm.$^2$. After a further 2 hours, the autoclave was vented and the polymer removed. The polymer yield was 770 g., giving an activity of 1.1 g./ma. Zr/atmos./hr.

TABLE 4

| Example No. | Transition metal complex | Matrix | Matrix pretreatment | | Initiator concentration (ma. metal) | Time, hrs. | Propylene pressure (atmos.) | Yield (g.) | Activity, g/ma./at./hr. |
|---|---|---|---|---|---|---|---|---|---|
| 26 | Zr($\pi$-allyl)$_4$ | Al$_2$O$_3$ | A | 500° C. | 0.5 | 4 | 7 | 53 | 3.9 |
| 27 | Zr(benzyl)$_4$ | Al$_2$O$_3$ | A | 650° C. | 0.5 | 1 | 7 | 10 | 2.9 |
| 28 | Ti(benzyl)$_4$ | Al$_2$O$_3$ | A | 350° C. | 0.5 | 4 | 7 | 76.4 | 5.5 |
| 29 | Zr(benzyl)$_4$ | Al$_2$O$_3$/ZnO | A | 500° C. | 0.5 | 0.8 | 7 | 4.4 | 2.0 |
| 30 | Zr(paramethylbenzyl)$_4$ | Al$_2$O$_3$ | A | 400° C. | 0.5 | 4.5 | 7 | 24 | 1.5 |
| 31 | Zr($\pi$-allyl)$_4$ | SiO$_2$ | B | | 3 | 4 | 10 | 14.8 | 0.1 |
| 32 | Zr($\pi$-allyl)$_3$Br | SiO$_2$ | B | | 0.78 | 4 | 10 | 40.3 | 1.3 |
| 33 | Cr($\pi$-allyl)$_3$ | Al$_2$O$_3$ | A | 650° C. | 0.57 | 3.5 | 7 | 0.9 | 0.1 |
| 34 | Zr(benzyl)$_4$ | Al$_2$O$_3$/MgO | See note | | 0.64 | 2 | 7 | 14 | 1.6 |
| 35 | Zr(benzyl)$_4$ | Al$_2$O$_3$ | See note | | 0.64 | 2 | 7 | 51.8 | 5.8 |

Examples 36–38

Gas Phase Polymerisation of Propylene.—A 5 litre stainless steel autoclave, fitted with isometric stirrer was heated to 65–75° C., and 0.3–0.7 kg. of standard polypropylene homopolymer charged to act as a dispersing agent for the initiator. The reactor, stirred at 100 r.p.m., was then evacuated to 30″ Hg and the vacuum

Example 38

350 g. of carrier polymer charged to reactor at 65° C., stirred and evacuated and purged six times with high purity propylene. The reactor was then purged for 19 hours with 220 litres/hour of high purity propylene.

2.5 millimoles of zirconium tetra-benzyl/Al$_2$O$_3$ initiator composition was injected into the reactor, stirring and purging continuing for 20 minutes. A further 2.5 millimoles of initiator was charged, and stirred and purged for a further 45 minutes. The autoclave was then pressurised to 20 kg./cm.² in 40 minutes with high purity propylene. Polymerisation was continued for a further 3 hours and the autoclave was vented and the polymer removed. The polymer yield was 180 g., giving an activity of 0.5 g./ma. Zr/atmos./hr.

Example 39

Polymerisation of 4-Methylpentene-1. — A litre flask was carefully dried and purged with nitrogen. In it was placed 300 ml. (200 g.) of 4-methylpentene-1, freshly distilled from calcium hydride and purged of dissolved oxygen with a dry nitrogen stream. This was stirred under reflux on a water bath at 60° C., and 10.5 ml. (0.44 mM.) of a toluene slurry of a zirconium tetrabenzyl/alumina initiator composition introduced in 1.5 ml. aliquots over 40 minutes. The pale brown slurry was stirred for a further 2½ hours under reflux, becoming more viscous as polymerisation took place. 10 ml. of methanol was introduced giving a white slurry from which 10 g. of white poly-(4-methylpentene-1) powder was isolated.

Example 40

Polymerisation of Butadiene.—A 2 litre three necked flasked was equipped with a stirrer, a gas inlet reaching below the level of liquid in the flask and a gas outlet via a condenser and drying tube containing a molecular sieve. The flask assembly was flamed out in a stream of nitrogen and cooled with the nitrogen still flowing. The flask was charged with 1 litre of dry oxygen-free toluene, heated to 60° C. and high purity, dry, oxygen-free, butadiene was then passed through the stirred solvent. When the solvent had become saturated with butadiene, 0.5 mM. of a zirconium tetrabenzyl/alumina composition was added to initiate polymerisation which was continued for 1 hour.

7.5 g. of polymer was obtained which was judged by I.R. to be at least 90% of the trans-1,4-type; it had a crystalline melting point of 147° C. The initiator activity was 17 g./ma. Zr/atmos./hr.

EXAMPLE 41

Polymerisation of Ethylene (High pressure).—In order to make the initiator compositions of our invention more easily pumpable into a high pressure polyethylene reactor, the composition was first subjected to an ultrasonic dispersion procedure. A composition comprising 0.65 mM. of zirconium complex/g. silica matrix, was added to oxygen, moisture and sulphur free xylene maintained under an atmosphere of nitrogen. 1 mM. of the same zirconium complex was also added to the xylene. The xylene/composition mixture thus obtained was circulated through a chamber containing a conventional ultrasonic probe vibrating at 20,000 c./s., and circulation continued for 15 minutes. On completion of the ultrasonic treatment, a dispersion containing 0.625% (g. composition/ml. xylene) of a composition comprising 0.85 mM. of zirconium complex/g. of silica was obtained.

A dispersed initiator composition made by reacting Zirconium tris($\pi$-allyl) bromide with silica was pumped into a standard continuous high pressure, stirred autoclave, polyethylene reactor at a rate of 4.5 g./hour. Polyethylene was obtained by feeding pure ethylene gas to the reactor at a pressure of 1575 kg./cm.² and a rate such that the dwell time of a monomer unit within the reactor was 3 minutes. A temperature of 160° C. was maintained in the reactor during polymerisation.

What we claim is:

1. A process for the polymerisation or copolymerisation of an olefinically unsaturated monomer which comprises contacting the monomer with a transition metal initiator composition which is the product obtained by reacting a transition metal complex of the general formula $$R_mMX_p$$

with a substantially inert matrix material which has reactive —OH groups on its surface for reaction with said complex and which is free from adsorbed water, said complex and said —OH groups being reacted to chemically bond said complex to the matrix according to the reaction Matrix (—OH)$_n$ + MR$_m$X$_p$ →
  Matrix (—O)$_n$MR$_{m-n}$X$_p$ + $m$RH, wherein M is a transition metal of Groups IVA to VIA of the Periodic Table of the Elements, each R is a hydrocarbon selected from the group consisting of alkyl, alkenyl, and substituted alkyl of general formula

—CH$_2$Y, where Y is selected from the group consisting of aromatic groups, polyaromatic groups, cycloalkenyl groups, and groups of general formula Z(R')$_3$, where Z is silicon, germanium, tin or lead and each R' is hydrocarbon or hydrogen, X is a monovalent ligand and $m$ and $p$ are integers, and $n$ is an integer not more than $(m-1)$, $m$ having a value from 2 to the highest valency of the metal M and $p$ having a value from 0 to 2 less than the valency of the metal M, with the proviso that when M is a metal of Group VIA, $p$ is 0, said monomer being an olefinically unsaturated monomer other than a polar vinyl monomer which reacts non-catalytically with the initiator composition.

2. A process as claimed in claim 1 in which the metal of the initiator composition is a metal of Group IVA.

3. A process as claimed in claim 1 in which the metal of the initiator composition is titanium, zirconium, hafnium or chromium.

4. A process as claimed in claim 1 in which one or more of the hydrocarbon groups R is or are a $\pi$-allylic group.

5. A process as claimed in claim 4 in which the transition metal complex is selected from tetrakis($\pi$-allyl) zirconium and hafnium, tris($\pi$-allyl) chromium, tetrakis($\pi$-methallyl) zirconium and hafnium, tris($\pi$-methylallyl) chromium and zirconium tris($\pi$-allyl) bromide.

6. A process as claimed in claim 1 in which each R is a —CH$_2$Y group.

7. A process as claimed in claim 6 in which the group or groups —CH$_2$Y is or are selected from benzyl, 1-methylene-1-naphthyl, p-methyl benzyl and trimethylsilylmethylene.

8. A process as claimed in claim 7 in which the transition metal complex is selected from zirconium and titanium tetra(benzyl), tris(benzyl) zirconium chloride, zirconium, tetrakis(p-methyl benzyl) zirconium and titanium tetrakis(1-methylene-1-naphthyl) and zirconium tetrakis (trimethylsilylmethylene).

9. A process as claimed in claim 1, in which the monovalent ligand X is chlorine or bromine.

10. A process as claimed in claim 1 in which the inert matrix material is selected from silica, alumina and mixtures thereof.

11. A process as claimed in claim 1 in which ethylene, propylene, 4-methylpentene-1 or butadiene is polymerised.

12. A process as claimed in claim 11 in which the monomer is ethylene and a chain transfer agent is added to the polymerisation mixture.

13. A process as claimed in claim 4 in which ethylene is polymerised at a pressure from 1000 to 3000 kg./cm.² and a temperature from 140 to 300° C.

14. A process as claimed in claim 11 in which ethylene is polymerised at a pressure from 0.1 to 300 atmospheres and a temperature from 50 to 160° C.

15. A process as claimed in claim 1 in which ethylene and propylene are copolymerised with or without other olefinically unsaturated monomer or monomers.

16. A process as claimed in claim 13 in which the initiator composition is treated by an ultrasonic dispersion procedure before use.

17. A process as claimed in claim 1 in which the olefinically unsaturated monomer is selected from the group consisting of mono-olefins, di-olefins, and vinyl chloride.

18. A process as claimed in claim 1 in which the monovalent ligand X is a halogen.

References Cited

UNITED STATES PATENTS

| | | | |
|---|---|---|---|
| 3,620,981 | 11/1971 | Magoon et al. | 260—94.9 DA |
| 3,166,542 | 1/1965 | Orgechowski et al. | 260—94.9 DA |
| 3,202,645 | 8/1965 | Yancey | 260—94.9 DA |
| 3,205,178 | 9/1965 | Orzechowski et al. | 260—94.9 DA |
| 3,392,160 | 7/1968 | Orzechowski | 260—94.9 DA |
| 3,157,712 | 11/1964 | Walker et al. | 260—94.9 |
| 3,324,101 | 6/1967 | Baker et al. | 260—94.9 |
| 3,134,642 | 5/1964 | Merter | 204—159.24 |
| 3,379,706 | 4/1968 | Wilke | 260—94.9 |

FOREIGN PATENTS

| | | |
|---|---|---|
| 1,495,160 | 3/1969 | Germany. |
| 1,591,425 | 4/1970 | France. |
| 1,145,958 | 3/1969 | Great Britain. |

OTHER REFERENCES

Giannini et al., Chemical Communications, 1968 (16), 940.

JOSEPH L. SCHOFER, Primary Examiner

E. J. SMITH, Assistant Examiner

U.S. Cl. X.R.

252—431 R; 260—85.3 R, 92.8 R, 93.7, 94.3, 94.9 DA